United States Patent
Song

(10) Patent No.: US 9,228,524 B2
(45) Date of Patent: Jan. 5, 2016

(54) STATIC AND DYNAMIC PRESSURE COMPENSATION FOR INTAKE OXYGEN SENSING

(71) Applicant: GM Global Technology Operations LLC, Detroit, MI (US)

(72) Inventor: B. Jerry Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 230 days.

(21) Appl. No.: 13/967,591

(22) Filed: Aug. 15, 2013

(65) Prior Publication Data

US 2015/0047424 A1 Feb. 19, 2015

(51) Int. Cl.
| | |
|---|---|
| *G01M 15/00* | (2006.01) |
| *F02D 41/24* | (2006.01) |
| *F02D 41/14* | (2006.01) |
| *F02D 41/02* | (2006.01) |
| *G01L 19/00* | (2006.01) |

(52) U.S. Cl.
CPC ............ *F02D 41/2474* (2013.01); *F02D 41/02* (2013.01); *F02D 41/1448* (2013.01); *F02D 41/1456* (2013.01); *F02D 41/1495* (2013.01); *G01L 19/0092* (2013.01); *F02D 2200/0406* (2013.01)

(58) Field of Classification Search
CPC ............ F92D 41/1495; G01M 15/102; G01M 15/042; F02D 41/1495; F01N 11/00
USPC ............... 73/114.73, 114.71, 114.72, 114.69, 73/114.01, 865.9
See application file for complete search history.

(56) References Cited

U.S. PATENT DOCUMENTS

| | | | |
|---|---|---|---|
| 4,081,725 A | 3/1978 | Schmidt et al. |
| 4,404,946 A | 9/1983 | Hoard et al. |
| 4,790,286 A | 12/1988 | Nishida et al. |
| 4,836,174 A | 6/1989 | Chujo et al. |
| 4,905,654 A | 3/1990 | Katsuno et al. |
| 4,942,860 A | 7/1990 | Chujo et al. |
| 4,990,235 A | 2/1991 | Chujo |
| 5,034,112 A | 7/1991 | Murase et al. |
| 5,190,017 A | 3/1993 | Cullen et al. |
| 5,205,260 A | 4/1993 | Takahashi et al. |
| 5,207,093 A | 5/1993 | Maeda |

(Continued)

FOREIGN PATENT DOCUMENTS

| | | |
|---|---|---|
| CN | 101988432 A | 3/2011 |
| CN | 202510230 U | 10/2012 |

(Continued)

OTHER PUBLICATIONS

U.S. Appl. No. 13/440,570, filed Apr. 5, 2012, Song.

(Continued)

*Primary Examiner* — Lisa Caputo
*Assistant Examiner* — Nigel Plumb

(57) ABSTRACT

An oxygen sensor pressure compensation system includes a static pressure compensation module to receive an oxygen sensor signal from an oxygen sensor and a pressure signal from a pressure sensor and to perform static pressure compensation. A dynamic pressure compensation module receives the oxygen sensor signal and the pressure signal and to perform dynamic pressure compensation. A summing module generates a compensated oxygen signal based on the static pressure compensation and the dynamic pressure compensation.

20 Claims, 7 Drawing Sheets

(56) References Cited

U.S. PATENT DOCUMENTS

| | | | |
|---|---|---|---|
| 5,465,617 A | 11/1995 | Dudek et al. | |
| 5,540,091 A * | 7/1996 | Nakagawa | F02M 25/0702 123/568.16 |
| 5,617,337 A | 4/1997 | Eidler et al. | |
| 5,639,961 A | 6/1997 | Lautenschutz | |
| 5,685,284 A * | 11/1997 | Nakamichi | F02D 41/1474 123/688 |
| 6,000,385 A | 12/1999 | Fukuma | |
| 6,029,451 A | 2/2000 | Gartner | |
| 6,164,270 A | 12/2000 | Bidner et al. | |
| 6,240,365 B1 | 5/2001 | Bunn | |
| 6,309,534 B1 | 10/2001 | Fray et al. | |
| 6,311,679 B1 | 11/2001 | Druzhinina et al. | |
| 6,405,106 B1 | 6/2002 | Sheth et al. | |
| 6,516,656 B1 * | 2/2003 | Jetter | G01M 15/102 73/114.71 |
| 6,575,148 B1 | 6/2003 | Bhargava et al. | |
| 6,581,370 B2 | 6/2003 | Sato et al. | |
| 6,711,892 B2 | 3/2004 | Tamura et al. | |
| 6,732,031 B1 | 5/2004 | Lightner et al. | |
| 6,738,697 B2 | 5/2004 | Breed | |
| 6,739,177 B2 | 5/2004 | Sato et al. | |
| 6,772,586 B2 | 8/2004 | Miyahara et al. | |
| 6,802,302 B1 | 10/2004 | Li et al. | |
| 6,817,197 B1 | 11/2004 | Padfield | |
| 7,104,259 B2 | 9/2006 | Terada | |
| 7,155,332 B2 | 12/2006 | Yamada et al. | |
| 7,181,335 B2 * | 2/2007 | Barba | F02D 33/02 701/108 |
| 7,195,009 B2 | 3/2007 | Cullen | |
| 7,254,477 B1 * | 8/2007 | Banks | G01L 3/245 701/114 |
| 7,261,098 B2 | 8/2007 | Vigild et al. | |
| 7,267,117 B2 | 9/2007 | Tonetti et al. | |
| 7,318,409 B2 | 1/2008 | Cullen | |
| 7,398,775 B2 | 7/2008 | Cullen | |
| 7,400,967 B2 | 7/2008 | Ueno et al. | |
| 7,409,275 B2 | 8/2008 | Sakurai et al. | |
| 7,463,960 B2 | 12/2008 | Thiel et al. | |
| 7,474,954 B1 * | 1/2009 | Zagone | F02D 41/0072 123/568.11 |
| 7,526,950 B2 | 5/2009 | Van Nieuwstadt et al. | |
| 7,532,963 B1 | 5/2009 | Lowrey et al. | |
| 7,565,901 B2 | 7/2009 | Furuta et al. | |
| 7,620,490 B2 | 11/2009 | Matsunaga | |
| 7,650,211 B2 | 1/2010 | Wang et al. | |
| 7,654,253 B2 | 2/2010 | Cullen | |
| 7,715,976 B1 | 5/2010 | Xiao et al. | |
| 7,974,749 B2 | 7/2011 | Zettel et al. | |
| 8,042,528 B2 | 10/2011 | Gates et al. | |
| 8,127,816 B2 | 3/2012 | Gnan | |
| 8,315,759 B2 | 11/2012 | Bauerle | |
| 8,469,010 B2 * | 6/2013 | Inoue | F01M 13/022 123/568.14 |
| 8,521,354 B2 | 8/2013 | Sasaki | |
| 8,733,081 B2 | 5/2014 | Miyashita | |
| 2002/0066442 A1 | 6/2002 | Muller et al. | |
| 2002/0139360 A1 | 10/2002 | Sato et al. | |
| 2003/0106367 A1 | 6/2003 | Osaki et al. | |
| 2003/0115854 A1 | 6/2003 | Tamura et al. | |
| 2003/0159521 A1 | 8/2003 | Sarholz et al. | |
| 2004/0061290 A1 | 4/2004 | Gray | |
| 2004/0079332 A1 | 4/2004 | Kotwicki | |
| 2004/0230345 A1 | 11/2004 | Tzamaloukas | |
| 2005/0072411 A1 | 4/2005 | Cullen | |
| 2005/0131620 A1 | 6/2005 | Bowyer | |
| 2005/0139193 A1 | 6/2005 | Kobayashi et al. | |
| 2005/0161029 A1 | 7/2005 | Ishikawa | |
| 2005/0274369 A1 | 12/2005 | Tonetti et al. | |
| 2006/0048760 A1 | 3/2006 | Matsunaga et al. | |
| 2006/0064228 A1 | 3/2006 | Huang | |
| 2006/0213490 A1 | 9/2006 | Vigild et al. | |
| 2007/0005609 A1 | 1/2007 | Breed | |
| 2007/0062499 A1 | 3/2007 | Miyasako et al. | |
| 2007/0100519 A1 | 5/2007 | Engel | |
| 2007/0174003 A1 | 7/2007 | Ueno et al. | |
| 2007/0181111 A1 | 8/2007 | Cullen | |
| 2008/0178853 A1 | 7/2008 | Yamaoka et al. | |
| 2008/0189009 A1 | 8/2008 | Wang et al. | |
| 2008/0270012 A1 | 10/2008 | Cullen | |
| 2008/0316006 A1 | 12/2008 | Bauman et al. | |
| 2009/0038308 A1 | 2/2009 | Nagae | |
| 2009/0132153 A1 | 5/2009 | Shutty et al. | |
| 2009/0254245 A1 | 10/2009 | Bauerle | |
| 2010/0042284 A1 | 2/2010 | Sasaki | |
| 2010/0185379 A1 * | 7/2010 | Burkhardt | F02D 41/1495 701/103 |
| 2010/0224174 A1 | 9/2010 | Tabata | |
| 2010/0307140 A1 * | 12/2010 | Viola | F01N 3/208 60/286 |
| 2011/0011378 A1 | 1/2011 | Nakamura | |
| 2011/0023847 A1 | 2/2011 | Gates et al. | |
| 2011/0054762 A1 | 3/2011 | Nakayama et al. | |
| 2011/0072793 A1 | 3/2011 | Bidner et al. | |
| 2011/0073086 A1 * | 3/2011 | Bahlo | F02D 41/123 123/703 |
| 2011/0077838 A1 | 3/2011 | Osburn et al. | |
| 2011/0191010 A1 | 8/2011 | Russ et al. | |
| 2012/0046854 A1 | 2/2012 | Sangkyu et al. | |
| 2012/0116648 A1 | 5/2012 | Russ et al. | |
| 2012/0227714 A1 | 9/2012 | Surnilla et al. | |
| 2012/0227719 A1 | 9/2012 | Surnilla et al. | |
| 2012/0247439 A1 * | 10/2012 | Ramappan | F02B 1/12 123/568.11 |
| 2012/0303346 A1 | 11/2012 | Takezoe et al. | |
| 2013/0054122 A1 | 2/2013 | Aoyagi | |
| 2013/0073179 A1 * | 3/2013 | Song | F02D 41/0072 701/102 |
| 2013/0199177 A1 * | 8/2013 | Holberg | F02D 41/144 60/605.2 |
| 2013/0226435 A1 * | 8/2013 | Wasberg | F02D 21/08 701/102 |
| 2013/0238218 A1 | 9/2013 | Wiggins et al. | |
| 2013/0253798 A1 | 9/2013 | Ramappan et al. | |
| 2013/0253802 A1 * | 9/2013 | Miyamoto | F02D 43/04 701/103 |
| 2013/0268176 A1 | 10/2013 | Song et al. | |
| 2013/0332050 A1 | 12/2013 | Song et al. | |
| 2014/0149015 A1 | 5/2014 | Pursifull | |
| 2014/0257673 A1 * | 9/2014 | Naik | F02D 41/30 701/104 |

FOREIGN PATENT DOCUMENTS

| | | |
|---|---|---|
| EP | 1481295 A1 | 12/2004 |
| JP | 63140856 A | 6/1988 |
| JP | 63159664 A | 7/1988 |
| JP | 405118246 | 5/1993 |
| JP | 2003148258 A | 5/2003 |
| JP | 2006029084 A | 2/2006 |
| JP | 2008087480 A | 4/2008 |
| JP | 2008248888 A | 10/2008 |
| JP | 2009243283 A | 10/2009 |
| JP | 2009287491 A | 12/2009 |
| JP | 2010203281 A | 9/2010 |
| WO | WO-03065135 A1 | 7/2003 |
| WO | WO-2004027244 A1 | 4/2004 |
| WO | WO-2009118605 A1 | 10/2009 |
| WO | WO-2011145223 A1 | 11/2011 |

OTHER PUBLICATIONS

U.S. Appl. No. 13/967,660, filed Aug. 15, 2013, Song et al.
U.S. Appl. No. 13/238,460, filed Sep. 21, 2011, Song et al.
U.S. Appl. No. 13/408,577, filed Feb. 29, 2012, Wasberg et al.
U.S. Appl. No. 13/425,723, filed Mar. 21, 2012, Ramappan et al.
U.S. Appl. No. 13/440,570, filed Apr. 5, 2012, Song et al.
U.S. Appl. No. 13/490,821, filed Jun. 7, 2012, Wiggins et al.
U.S. Appl. No. 13/490,885, filed Jun. 7, 2012, Song et al.
U.S. Appl. No. 13/786,944, filed Mar. 6, 2013, Naik et al.
U.S. Appl. No. 13/967,660, filed Aug. 15, 2013, Song.

* cited by examiner

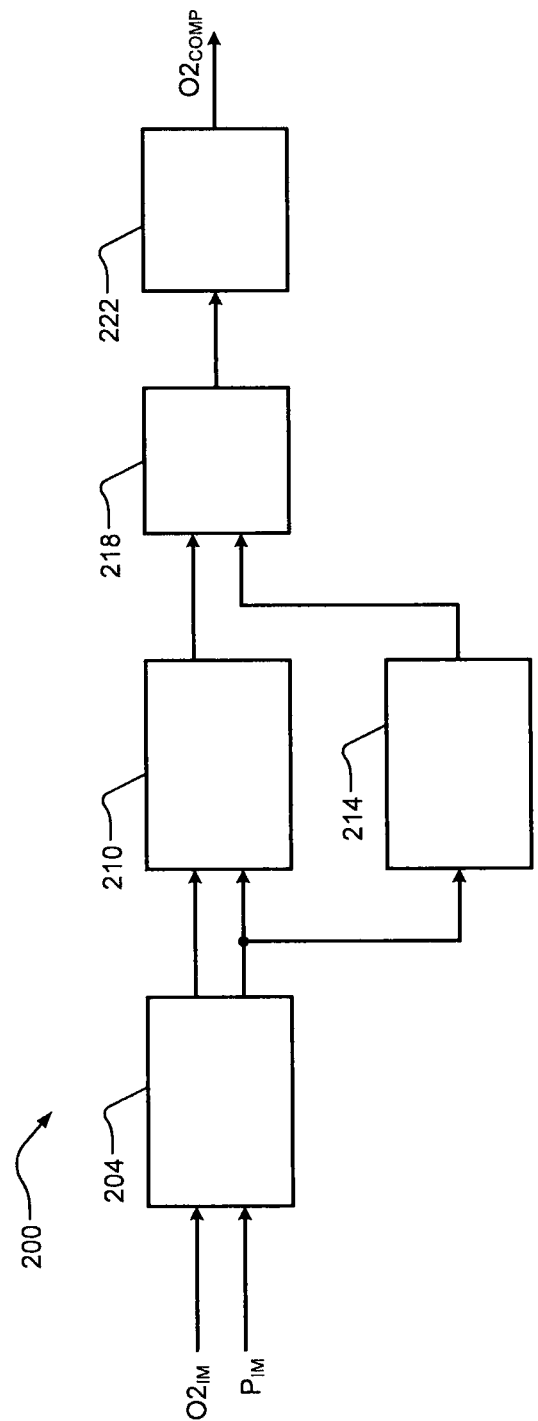

STATIC AND DYNAMIC PRESSURE COMPENSATION FOR INTAKE OXYGEN SENSING

CROSS-REFERENCE TO RELATED APPLICATIONS

This application is related to U.S. patent application Ser. No. 13/967,660filed on Aug. 15, 2013. The entire disclosure of the above application is incorporated herein by reference.

FIELD

The present disclosure relates to compensation of an oxygen sensor signal due to changes in pressure, and more particularly to compensation of oxygen sensor signals for intake manifolds and exhaust systems of vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Oxygen sensors may be used to sense a level of oxygen in an intake manifold or an exhaust system of a vehicle. The oxygen sensors help to determine an oxygen concentration or composition of the intake or exhaust gas. However, the oxygen sensors are typically sensitive to pressure changes. It can be difficult to measure the oxygen in the intake manifold or the exhaust system because the pressure dynamically varies during operation. Whether the engine is naturally aspirated or force fed, compensation may be performed on the output of the oxygen sensor to compensate for pressure effects.

SUMMARY

An oxygen sensor pressure compensation system includes a static pressure compensation module to receive an oxygen sensor signal from an oxygen sensor and a pressure signal from a pressure sensor and to perform static pressure compensation. A dynamic pressure compensation module receives the oxygen sensor signal and the pressure signal and performs dynamic pressure compensation. A summing module generates a compensated oxygen signal based on the static pressure compensation and the dynamic pressure compensation.

In other features, a response rate matching module is connected to the oxygen sensor, the pressure sensor, the static pressure compensation module and the dynamic pressure compensation module to match a response rate of the oxygen signal and the pressure signal.

In other features, the response rate matching module includes a first filter to receive the oxygen signal and a second filter to receive the pressure signal. The first and second filters are first order filters with different constants. The static pressure compensation module includes a first lookup table to convert the oxygen signal to an oxygen percentage signal and a second lookup table to receive the pressure signal and to generate a correction factor.

In other features, outputs of the first lookup table and the second lookup table are input to a summer to generate the static pressure compensation or a multiplier to generate the static pressure compensation.

In other features, the dynamic pressure compensation module includes a first lookup table to receive the pressure signal and to generate a derivative of the static pressure compensation. A delay circuit receives the pressure signal. A difference circuit receives an output of the delay circuit and the pressure signal and generates a pressure difference. A multiplier receives a constant, an output of the difference circuit and an output of the first lookup table and generates the dynamic pressure compensation.

In other features, a smoothing circuit performs smoothing of the compensated oxygen signal.

A vehicle includes an intake manifold and the oxygen sensor pressure compensation system. The oxygen sensor and the pressure sensor are arranged in the intake manifold.

A vehicle includes an exhaust system and the oxygen sensor pressure compensation system. The oxygen sensor and the pressure sensor are arranged in the exhaust system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a functional block diagram of an example of the oxygen sensor pressure compensating module according to the present disclosure;

In the drawings, reference numbers may be reused to identify similar and/or identical elements.

DETAILED DESCRIPTION

Figure 1A:
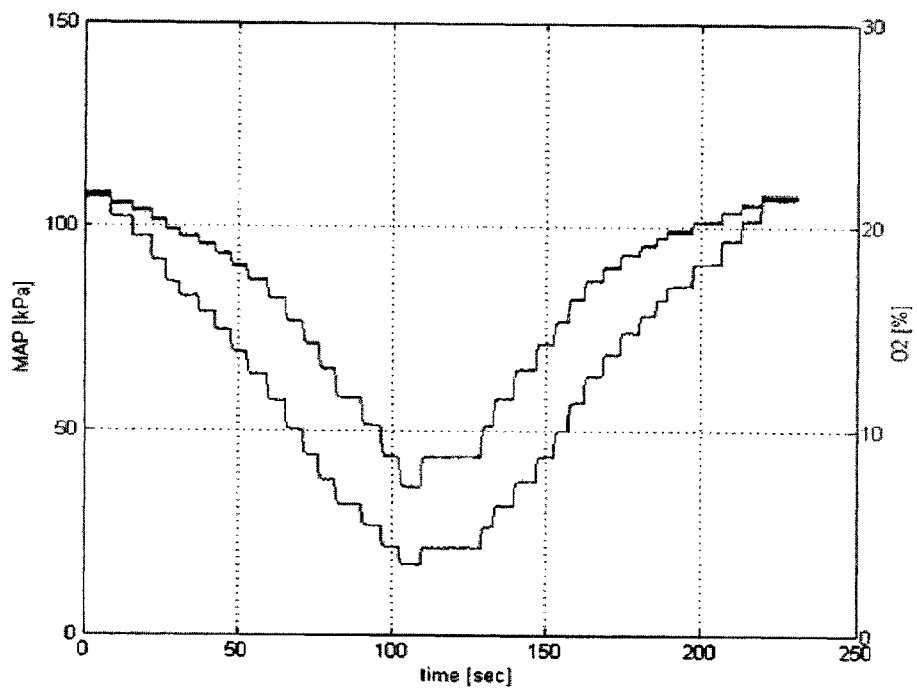
FIGS. 1A-1C are graphs illustrating intake manifold pressure and oxygen concentration as a function of time, oxygen concentration as a function of intake manifold pressure and oxygen concentration, and intake manifold pressure during tip in and tip out.
Figure 1B:
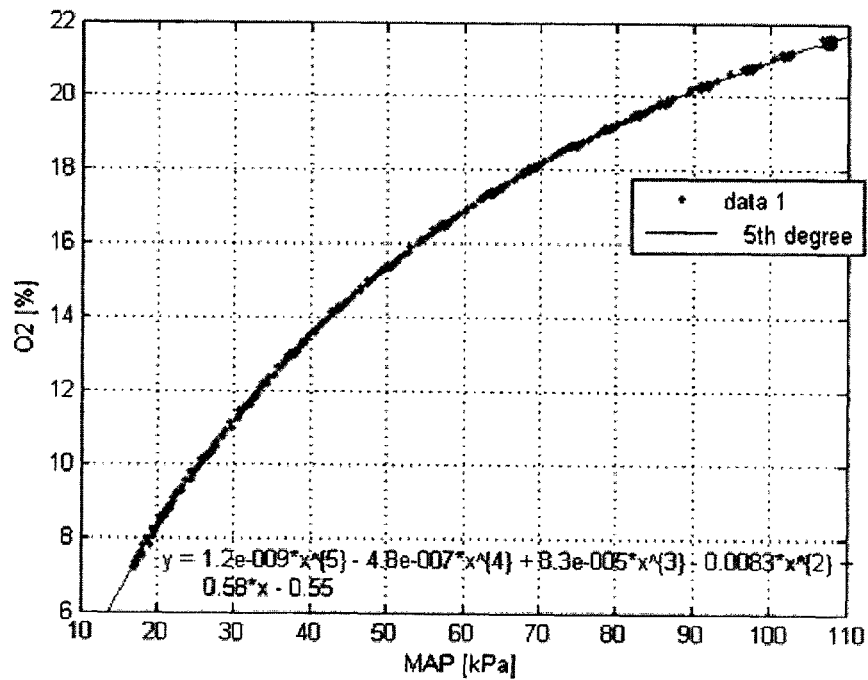
Figure 1C:
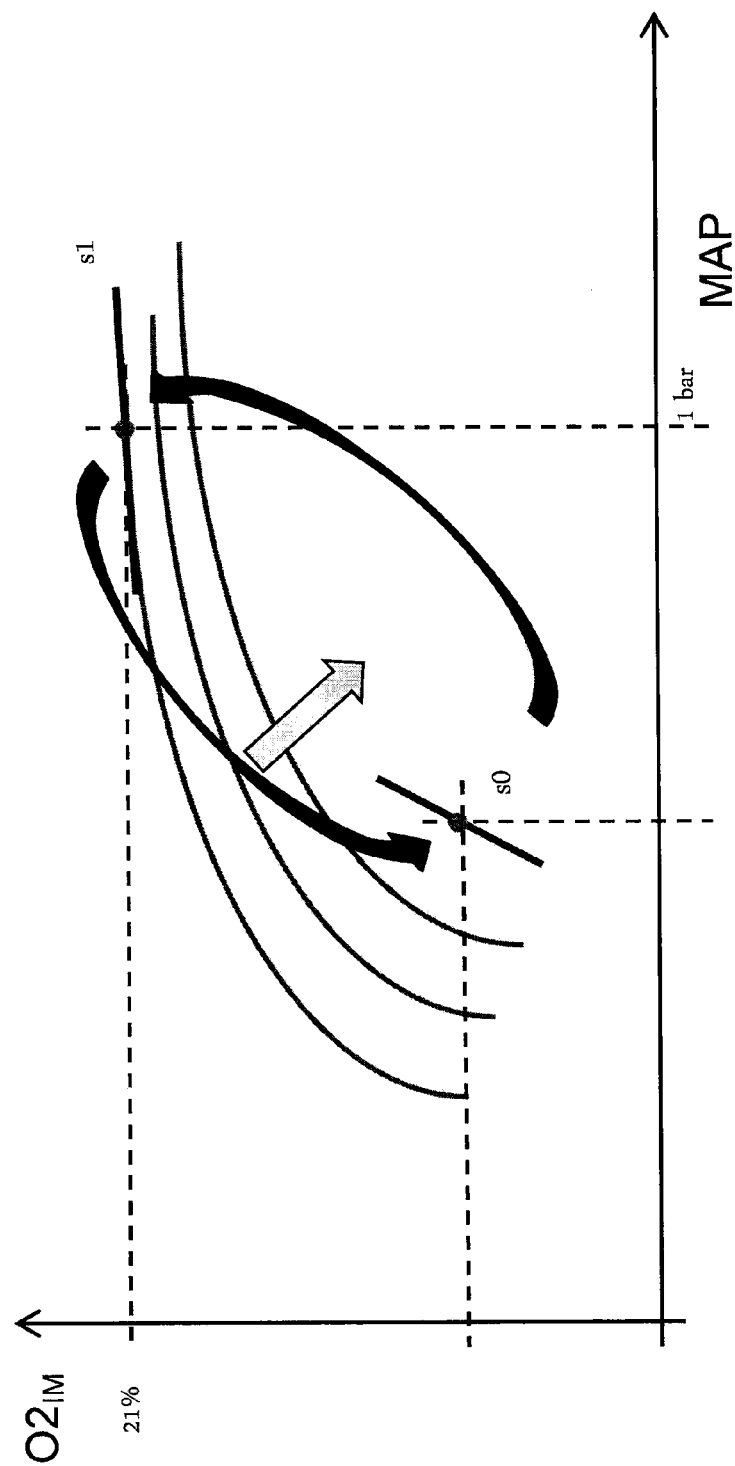

Referring now to FIGS. 1A-1C, various graphs relating to oxygen concentration and intake manifold pressure are shown. FIG. 1A shows intake manifold pressure and oxygen concentration as a function of time. FIG. 1B shows oxygen concentration as a function of intake manifold pressure and oxygen concentration. FIG. 1C shows intake manifold pressure and intake manifold pressure during tip in and tip out.

As can be appreciated, FIGS. 1A and 1B demonstrate that the output of the oxygen sensor is sensitive to both the oxygen molecular concentration (partial pressure of oxygen) and total pressure. FIG. 1C shows that small changes in intake manifold pressure can correspond to large changes in oxygen concentration and that large changes in intake manifold pressure may also correspond to small changes in oxygen concentration. Without dynamic compensation, the oxygen concentration jumps to a higher value during tip in. This may lead to under-estimation of the exhaust gas recirculation percentage. Likewise, during tip-out the oxygen concentration goes lower slower at first and then faster. This may lead to over-estimating the exhaust gas recirculation percentage.

The present disclosure describes systems and methods for compensating the pressure level for static and dynamic pressure changes to improve the accuracy of the measurement of the oxygen concentration.

Figure 2A:
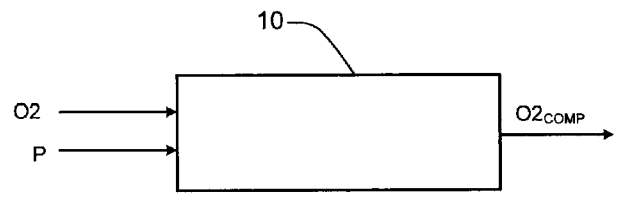
FIGS. 2A-2C illustrate examples of the oxygen sensor pressure compensating modules according to the present disclosure.
Figure 2B:
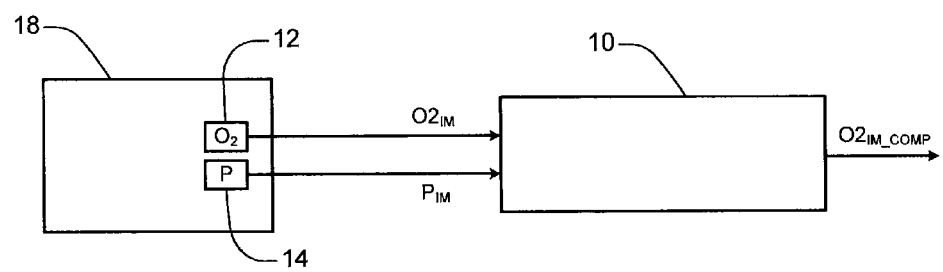
Figure 2C:
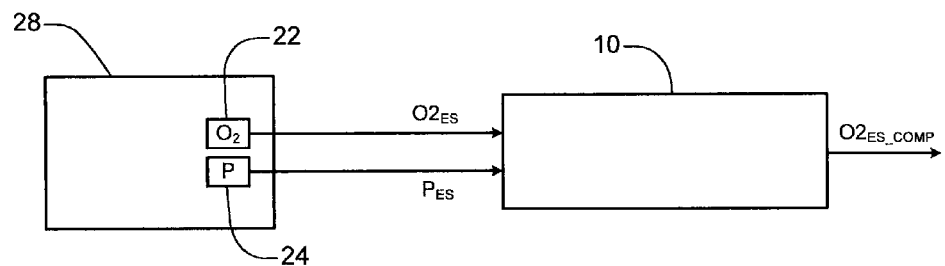

Referring now to FIGS. 2A-2C, examples of an oxygen sensor pressure compensating module 10 according to the present disclosure are shown. In FIG. 2A, the oxygen sensor pressure compensating module 10 receives an oxygen signal 02 and a pressure signal P and generates a compensated oxygen signal $O2_{COMP}$.

In FIG. 2B, an example implementation is shown where the oxygen sensor pressure compensating module 10 receives an oxygen signal $O2_{IM}$ from an oxygen sensor 12 and a pressure signal $P_{IM}$ from a pressure sensor 14. The oxygen sensor 12 and the pressure sensor 14 are arranged in an intake manifold 18 of a vehicle. The oxygen sensor pressure compensating module 10 generates a compensated oxygen signal $O2_{IM\_COMP}$.

In FIG. 2C, an example implementation is shown where the oxygen sensor pressure compensating module 10 receives an oxygen signal $O2_{ES}$ from an oxygen sensor 22 and a pressure signal $P_{ES}$ from a pressure sensor 24. The oxygen sensor 22 and the pressure sensor 24 are arranged in an exhaust system 28 of a vehicle. The oxygen sensor pressure compensating module 10 generates a compensated oxygen signal $O2_{ES\_COMP}$.

Figure 3:
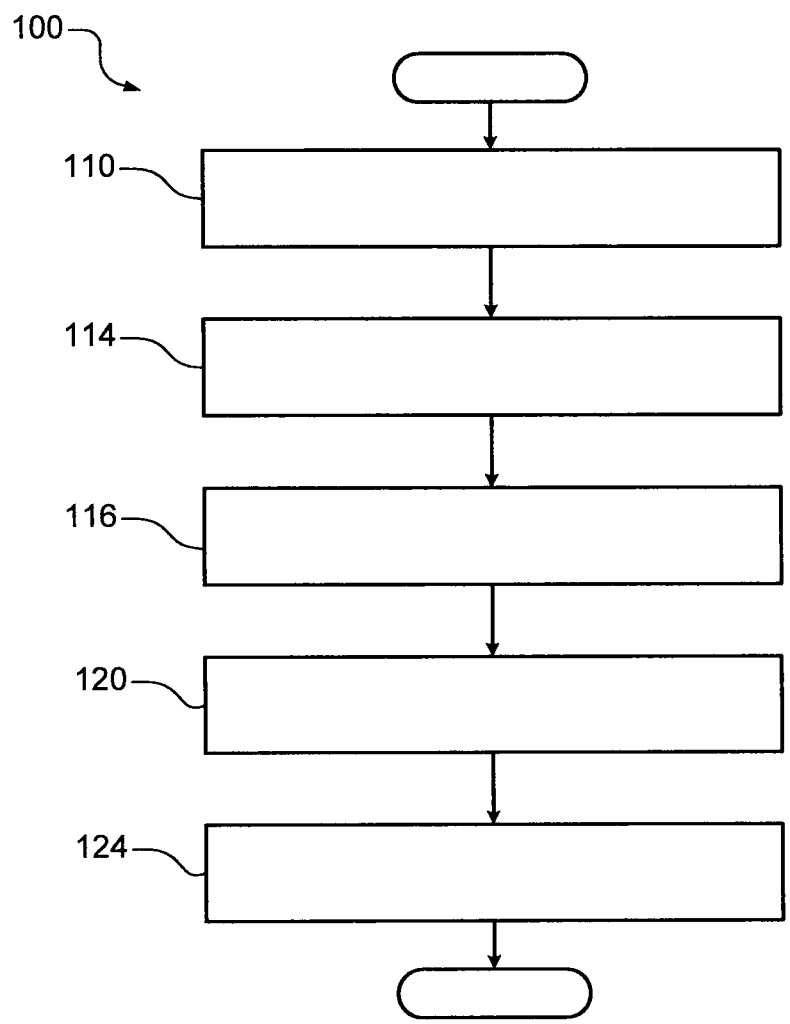
FIG. 3 is a flowchart illustrating an example of a method for performing the oxygen sensor pressure compensation according to the present disclosure.

In FIG. 3, an example of a method 100 performed by the oxygen sensor pressure compensating module is shown. At 110, the oxygen sensor pressure compensating module measures the oxygen and pressure in the intake manifold (or exhaust system). At 114, response rate matching is performed for the pressure level and oxygen. At 116, static pressure compensation is performed. At 120, dynamic pressure compensation is performed. A compensated oxygen signal is generated based on the static and dynamic pressure compensation. At 124, smoothing of the compensated oxygen signal is performed.

In FIG. 4, an example of an oxygen sensor pressure compensating module 200 is shown to include a response rate matching module 204, which performs response rate matching of the pressure and oxygen signals. In some examples, first order filters may be used. In some examples, the first order filters use different filter constants.

The oxygen sensor pressure compensating module 200 further includes a static pressure compensation module 210 that communicates with the response rate matching module. The static pressure compensation module 210 compensates the oxygen signal for static pressure. In some examples, the oxygen signal is compensated for static pressure based on $O2_{IM\_spc}=O2_{IM}+F_{corr}$, where $F_{corr}$ is a correction factor. In other examples, oxygen signal compensated for static pressure or $O2_{IM\_spc}=O2_{IM}\times F_{corr}$, where $F_{corr}$ is a correction factor.

The oxygen sensor pressure compensating module 200 further includes a dynamic pressure compensation module 214. The dynamic pressure compensation module 214 compensates the oxygen signal for dynamic pressure. In some examples, the oxygen signal is compensated for dynamic pressure changes based on $O2_{IM\_dpc}=Ks\Delta map$, where $\Delta map$ is the change in pressure, K is a constant and s is a derivative of the static pressure compensation term.

Outputs of the static pressure compensation module 210 or $O2_{IM\_spc}$ and the dynamic pressure compensation module 214 or $O2_{IM\_dpc}$ are input to a summing module 218, which sums the inputs to generate $O2_{IM\_COMP}$. In some examples, an output of the summing module 218 is input to a smoothing module 222, which performs smoothing of the compensated oxygen signal $O2_{IM\_COMP}$ and generates $O2_{IM\_COMP\_F}$.

Figure 5:
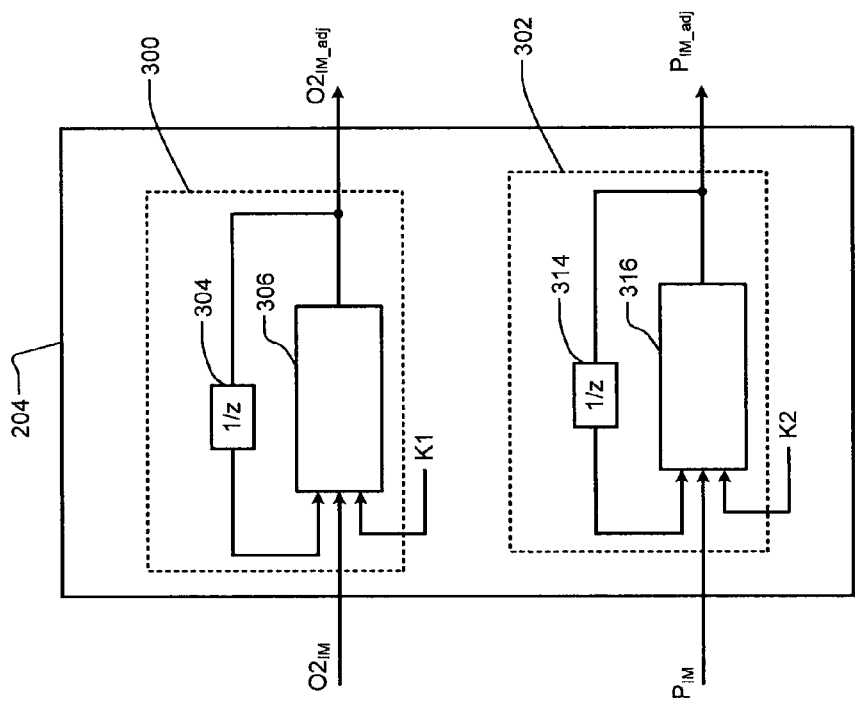
FIG. 5 is a functional block diagram of an example of a response rate matching module according to the present disclosure.

In FIG. 5, an example of the response rate matching module 204 is shown. The rate response matching module 204 includes a first filter 300 and a second filter 302. The first filter 300 may be a first-order filter that includes a delay circuit 304 and a calculating module model 306. The calculating module 306 receives the oxygen signal $O2_{IM}$, a delayed output of the calculating module 306 and a filter constant K1 and generates an output $O2_{IM\_adj}$. In some examples, the first filter 300 multiplies the delayed output of the calculating module 306 by the filter constant K1. In some examples, the filter constant K1 is between 0 and 1.

The second filter 302 may be a first-order filter that includes a delay circuit 314 and a calculating module model 316. The calculating module 316 receives the signal $P_{IM}$, a delayed output of the calculating module 316 and a filter constant K2 and generates an output $P_{IM\_adj}$. In some examples, the second filter 302 multiplies the delayed output of the calculating module 316 by the filter constant K2. In some examples, the filter constant K2 is between 0 and 1.

Figure 6:
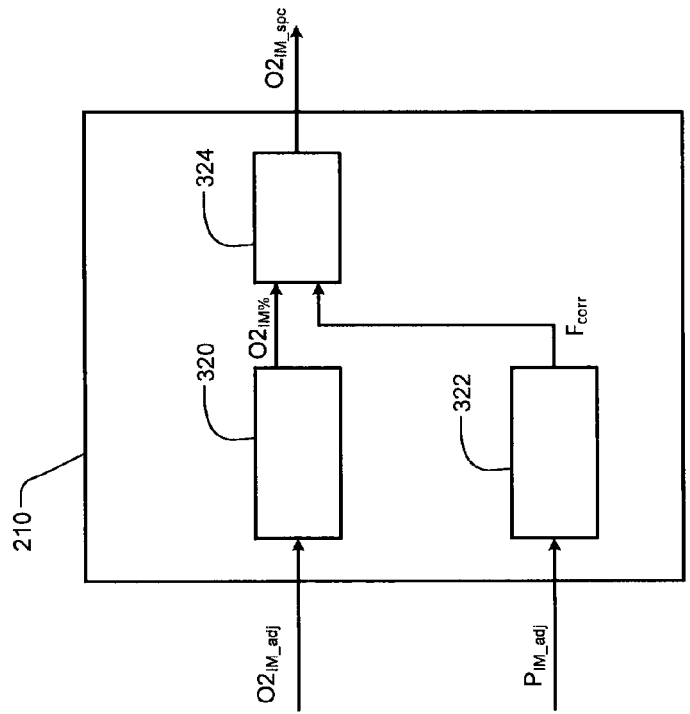
FIG. 6 is a functional block diagram of an example of a static pressure compensation module according to the present disclosure.

In FIG. 6, an example of the static pressure compensation module 210 is shown. The static pressure compensation module 210 includes a first lookup table 320, a second lookup table 322 and a summer or multiplier 324. The first lookup table 320 receives the adjusted intake manifold oxygen signal $O2_{\_adj}$ and outputs an intake manifold oxygen percentage signal $O2_{IM\%}$. The second lookup table 322 receives the adjusted intake manifold pressure signal $P_{IM\_adj}$ and outputs a correction factor $F_{Corr}$. The summer or multiplier 324 sums the correction factor or multiplies the correction factor by the intake manifold oxygen percentage signal $O2_{IM\%}$.

Figure 7:
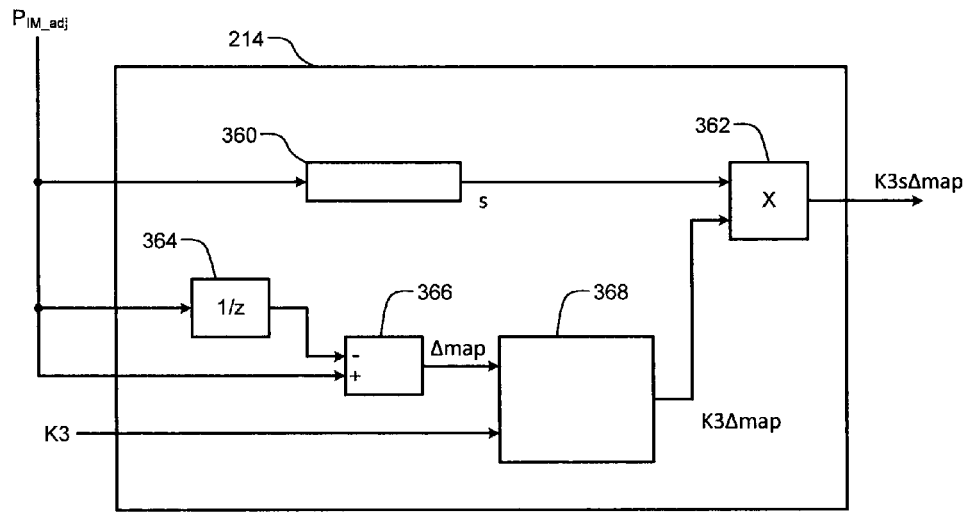
FIG. 7 is a functional block diagram of an example of a dynamic pressure compensation module according to the present disclosure.

In FIG. 7, an example of the dynamic pressure compensation module 214 is shown. The dynamic pressure compensation module 214 includes a first lookup table 360 that generates a derivative of the static pressure compensation terms based on the adjusted intake manifold pressure signal $P_{IM\_adj}$. A delay circuit 364 provides a delayed adjusted intake manifold pressure signal $P_{IM\_adj}$ to a subtracting input of calculating circuit 366, which also receives adjusted intake manifold pressure signal $P_{IM\_adj}$. The calculating circuit 366 generates an intake manifold pressure change or $\Delta map$, which is output to multiplier 368. The multiplier 368 also receives a constant K3. Outputs all the multiplier of 368 and the lookup table 360 are input to multiplier 362, which generates $O2_{IM\_dpc}=K3s\Delta map$.

Figure 8:
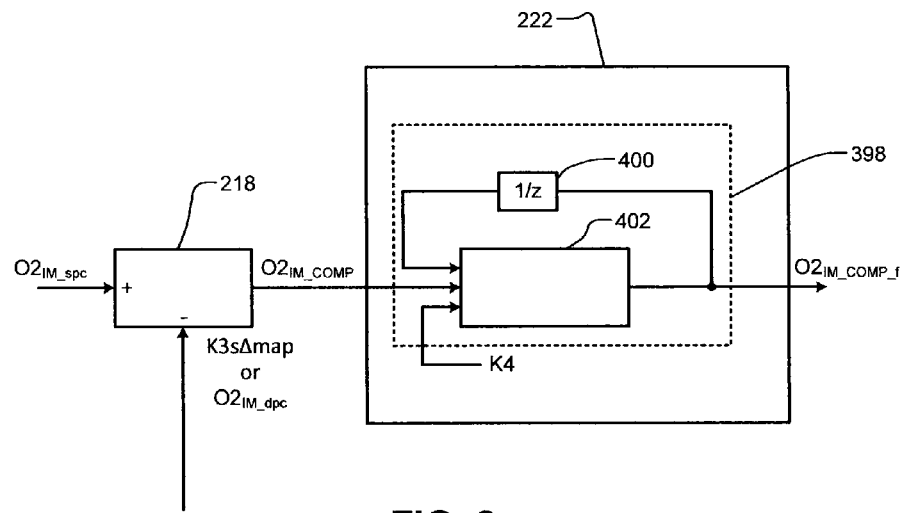
FIG. 8 is a functional block diagram of an example of a smoothing module according to the present disclosure.

In FIG. 8, the summing module 218 sums the static pressure $O2_{IM\_spc}=O2_{IM}+F_{corr}$ or $O2_{IM\_spc}=O2_{IM}\times F_{corr}$ and the dynamic pressure $O2_{IM\_dpc}=K3s\Delta map$ to generate $O2_{IM\_COMP}$. The smoothing module 222 generates the filtered compensated intake manifold oxygen signal $O2_{IM\_COMP\_F}$. In some examples, the smoothing module 222 may include a filter 398 including a delay circuit 400 and a calculating circuit 402. In some examples, the filter 398 multiplies the delayed output of the calculating circuit 402 by the filter constant K4. In some examples, the filter constant K4 is between 0 and 1.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An oxygen sensor pressure compensation system, comprising
   a static pressure compensation module configured to (i) receive an oxygen sensor signal from an oxygen sensor and a pressure signal from a pressure sensor, (ii) retrieve a correction factor based on the pressure signal, and (iii) apply the correction factor to the oxygen sensor signal to generate a static pressure compensation signal, wherein the static pressure compensation signal corresponds to a static pressure as measured by the pressure sensor;
   a dynamic pressure compensation module configured to (i) receive the pressure signal, (ii) generate a dynamic pressure compensation signal based on the pressure signal, wherein the dynamic pressure compensation signal corresponds to a change in the pressure signal from a previously received pressure signal; and
   a summing module to configured to combine the static pressure compensation signal and the dynamic pressure compensation signal to generate a compensated oxygen signal.

2. The oxygen sensor pressure compensation system of claim 1, further comprising a response rate matching module connected to the oxygen sensor, the pressure sensor, the static pressure compensation module and the dynamic pressure compensation module, wherein the rate matching modules is configured to match a response rate of the oxygen signal and the pressure signal.

3. The oxygen sensor pressure compensation system of claim 2, wherein the response rate matching module includes a first filter to receive the oxygen signal and a second filter to receive the pressure signal.

4. The oxygen sensor pressure compensation system of claim 3, wherein the first and second filters are first order filters with different constants.

5. The oxygen sensor pressure compensation system of claim 1, wherein the static pressure compensation module includes:
   a first lookup table to convert the oxygen signal to an oxygen percentage signal; and
   a second lookup table to receive the pressure signal and to generate the correction factor.

6. The oxygen sensor pressure compensation system of claim 5, wherein outputs of the first lookup table and the second lookup table are input to:
   a summer to generate the static pressure compensation signal; or
   a multiplier to generate the static pressure compensation signal.

7. The oxygen sensor pressure compensation system of claim 1, wherein the dynamic pressure compensation module includes:
   a first lookup table to receive the pressure signal and to generate a derivative of the static pressure compensation signal;
   a delay circuit to receive the pressure signal;
   a difference circuit to receive an output of the delay circuit and the pressure signal and to generate the change in the pressure signal, wherein the output of the delay circuit corresponds to the previously received pressure signal; and
   a multiplier to receive a constant, an output of the difference circuit and an output of the first lookup table and to generate the dynamic pressure compensation signal.

8. The oxygen sensor pressure compensation system of claim 1, further comprising a smoothing circuit to perform smoothing of the compensated oxygen signal.

9. A vehicle comprising:
   an intake manifold, wherein the oxygen sensor and the pressure sensor are arranged in the intake manifold; and
   the oxygen sensor pressure compensation system of claim 1.

10. A vehicle comprising:
    an exhaust system, wherein the oxygen sensor and the pressure sensor are arranged in the exhaust system; and
    the oxygen sensor pressure compensation system of claim 1.

11. A method compensating an oxygen sensor for pressure variations, comprising
    receiving an oxygen sensor signal from an oxygen sensor and a pressure signal from a pressure sensor;
    retrieving a correction factor based on the pressure signal;

applying the correction factor to the oxygen sensor signal to generate a static pressure compensation signal, wherein the static pressure compensation signal corresponds to a static pressure as measured by the pressure sensor;

generating a dynamic pressure compensation signal based on the pressure signal, wherein the dynamic pressure compensation signal corresponds to a change in the pressure signal from a previously received pressure signal; and combining the static pressure compensation signal and the dynamic pressure compensation signal to generate a compensated oxygen signal.

12. The method of claim 11, further comprising matching a response rate of the oxygen signal and the pressure signal.

13. The method of claim 12, further comprising using a first filter to receive the oxygen signal and a second filter to receive the pressure signal.

14. The method of claim 13, wherein the first and second filters are first order filters with different constants.

15. The method of claim 11, further comprising:
using a first lookup table to convert the oxygen signal to an oxygen percentage signal; and
using a second lookup table to receive the pressure signal and to generate the correction factor.

16. The method of claim 15, wherein outputs of the first lookup table and the second lookup table are input to:

a summer to generate the static pressure compensation signal; or
a multiplier to generate the static pressure compensation signal.

17. The method of claim 11, further comprising:
generating a derivative of the static pressure compensation signal;
delaying the pressure signal, wherein the delayed pressure signal corresponds to the previously received pressure signal;
generating the change in the pressure signal based on the delayed pressure signal and the pressure signal; and
generating the dynamic pressure compensation signal based on a constant, the change in the pressure signal, and the derivative of the state pressure compensation signal.

18. The method of claim 11, further comprising performing smoothing of the compensated oxygen signal.

19. The method of claim 11, further comprising arranging the oxygen sensor and the pressure sensor are arranged in an intake manifold of an engine.

20. The method of claim 11, further comprising arranging the oxygen sensor and the pressure sensor are arranged in an exhaust system of an engine.

* * * * *